July 18, 1939.  C. F. JONES  2,166,440

CAMERA

Filed Feb. 7, 1936  2 Sheets-Sheet 1

INVENTOR.
Charles F. Jones,
BY
ATTORNEY

July 18, 1939.  C. F. JONES  2,166,440
CAMERA
Filed Feb. 7, 1936  2 Sheets-Sheet 2
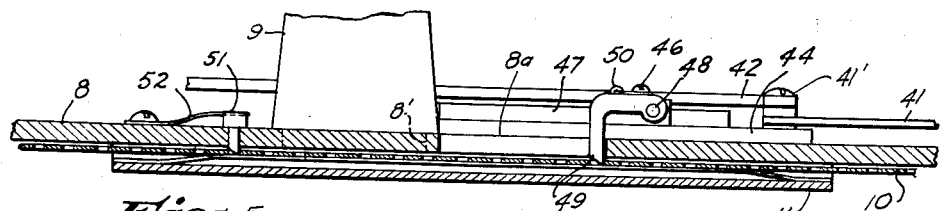
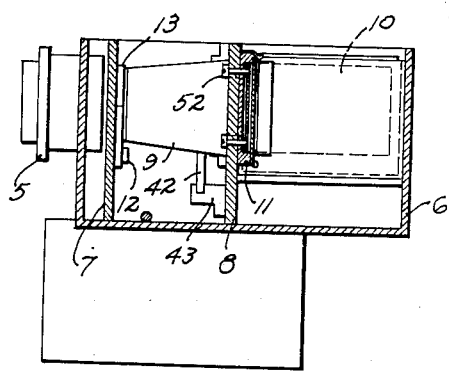
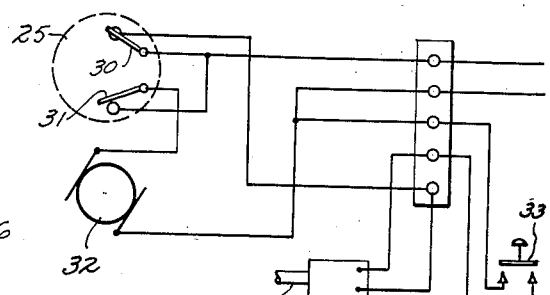
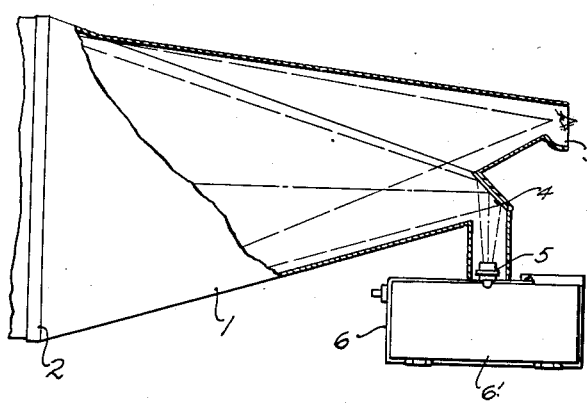
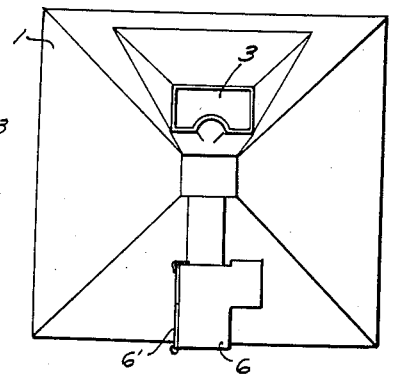
INVENTOR.
Charles F. Jones,
BY
ATTORNEY Patented July 18, 1939

2,166,440

UNITED STATES PATENT OFFICE 2,166,440

CAMERA

Charles F. Jones, Burlingame, Calif.

Application February 7, 1936, Serial No. 62,807

4 Claims. (Cl. 250—66)

This invention relates to improvements in photographic apparatus of the kind adapted for use in producing X-ray or other kinds of photographs, whereby successive exposures of varying durations may be made at irregular intervals.

In roentgenology it has heretofor been the common practice to pass a beam of X-rays through the particular body to be examined and by means of a fluorescent screen and a photographic plate, to record the varying intensities of the emergent beam and thus obtain a shadow picture of the interior of the body. However, the usual practice of making single exposures upon separate plates has proved extremely costly and has failed to give sufficient flexibility of operation. For instance, where it is desired to watch the passage of certain materials through the alimentary tract or the intestines or to record the periodic functioning of the stomach or other organs, it is essential that the diagnostician or other operator of the camera be able to take a series of pictures showing the various stages of the treatment or reactions, and it is therefore a major object of my invention to provide photographic apparatus whereby the camera operator may view the fluorescent screen and at the same time make successive photographs thereof whenever and as often as he wishes, so that a series of permanent records will be made for later study and diagnosis.

In order to afford means for accomplishing these results I have provided improved photographic apparatus for use in taking X-ray or other kinds of pictures whereby a series of successive exposures of a sensitized cinematographic film may be made and the length of each exposure and the interval between the different exposures may be varied at will. By using ordinary motion picture film a large number of small pictures can be made at a very low cost, and after they are developed the entire roll can be projected upon an ordinary motion picture viewing screen, or if preferred enlargements can be made of all or part of the various negatives depending upon the particular needs of the case.

Another object of my invention is to provide improved photographic apparatus embodying electrically operated means controllable by a hand operated switch for operating a camera shutter, whereby a film in the camera may be exposed to light rays passing through the camera lens, and electrically operated means for automatically advancing the film after each exposure has been entirely completed.

It is also an object of my invention to provide photographic apparatus for making X-ray photographs wherein the camera is placed out of the direct path of the X-rays and at an angle thereto, for by this construction the film is protected from premature exposure, and further the resultant photograph obtained is solely from exposure of the film to the visible rays emanating from the screen and reflected into the camera. Because the object being photographed lies in a single plane, i. e., the plane of the fluorescent screen, a very wide aperture lens may be used in the camera which means that a shorter exposure time is necessary for satisfactory results. If ordinary motion picture film which has a very fast emulsion is also used, the exposure necessary for each photograph is reduced to a very short time.

Other and further objects of the present invention will be pointed out hereinafter, indicated in the appended claims, or obvious to one skilled in the art upon an understanding of the present disclosure. For the purposes of this application, I have elected to show herein certain forms and details of a camera construction representative of my invention; it is understood however, that these are presented here for purposes of illustration only, and that therefore they are not to be regarded as exhaustive of the variations of the invention, nor are they to be given any interpretation such as might have the effect of limiting the claims, short of the true and most comprehensive scope of the invention in the art.

In the accompanying drawings—

Fig. 4 is an enlarged sectional view taken at 4—4 of Fig. 3.

Fig. 5 is a sectional view taken at 5—5 in Fig. 3.

Fig. 6 is a wiring diagram of the camera.

Fig. 7 is a side elevation partly in section of photographic apparatus embodying my invention.

Fig. 8 is a front elevation of the apparatus of Fig. 7.

Figure 2:
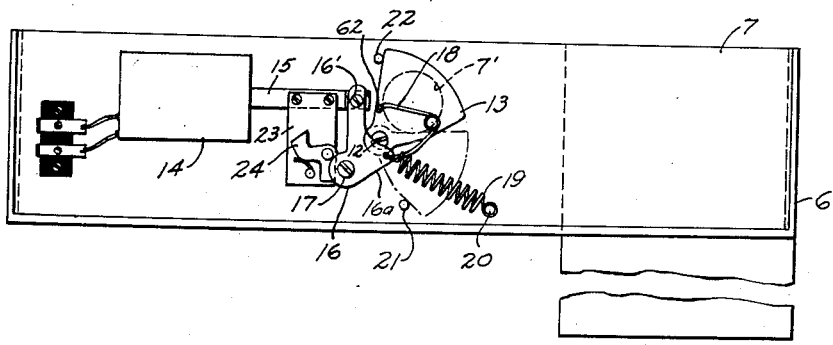
Fig. 2 is a horizontal section taken at 2—2 of Fig. 1.
Figure 1:
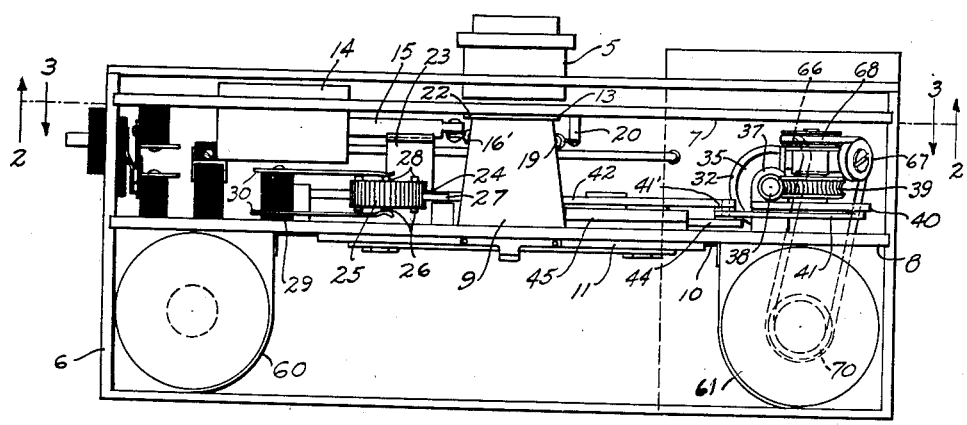
Fig. 1 is a side elevation of the interior of a camera constituting part of my improved photographic apparatus.

Referring now to the drawings and particularly to Figs. 7 and 8, the numeral 1 designates the bellows or hood of a fluoroscope, having a fluorescent screen 2 at its enlarged end upon which are cast the shadows resulting from passing a beam of X-rays through a body to be examined or photographed, a sight opening 3 for viewing the screen, and a mirror 4 for reflecting the image appearing on the screen through a lens tube 5 of a camera. By providing the mirror 4 and placing the camera below the X-ray path, the operator is enabled to view the screen 2 at all times and to also take photographs of the shadows on the screen as and when he wishes. Furthermore, the film in the camera is protected from fogging.

The camera casing 6 is preferably of a general rectangular shape and its interior is divided into a plurality of compartments by longitudinally disposed partition panels 7 and 8. The partition panels slidably and removably extend into suitable grooves provided in the end walls of the casing, and their primary purposes are to support, respectively, the camera's shutter operating and film advancing mechanisms. The lens tube 5 mounts a suitable camera lens which is aligned with an aperture located in the top side of the camera casing and with similar apertures 7' and 8' provided respectively in the partition panels 7 and 8. Suitably secured to the panel 8 at points around the aperture 8' therein is an upwardly disposed hood 9 which has its unattached open end extending in close proximity to and in alignment with the aperture 7' in the panel 7. A cinematographic film 10 travels in guides 11 secured to the underneath side of the panel 8 and is positioned to intercept the light rays passing through the camera lens. The guides 11 may conveniently be made as a hinged backing plate provided with parallel grooves adapted to receive the film advancing pins hereinafter described in detail. A feed magazine 60 is removably supported in one end of the casing 6 immediately below partition plate 8 and a takeup magazine 61 is provided at the other end of the casing to take up the film after exposure as hereinafter described.

Pivotally mounted as at 12 on the underneath side of the panel 7 is a shutter 13 which normally closes the aperture 7'. Mounted on the panel 7 at one side of the aperture 7' is an electromagnet 14 which may be conveniently made as a solenoid having an armature 15, to the end of which is pivotally attached an arm 16' of a bell crank 16. The bell crank is fulcrumed at 17, and its other arm 16a is attached to one end of a semi-rigid spring connecting member 18, the opposite end of the latter being attached to the shutter 13 at 62. As shown, this spring 18 may be formed as a one or two coil spiral with long end portion extending therefrom at approximately 90° or 100° to each other. A spiral spring 19 anchored at one end by a pin 20 to the panel 7, is attached at its opposite end to the arm 16a of the bell crank, and normally holds the shutter 13 in closed position, i. e., covering the aperture 7' as shown in full lines in Fig. 2. When the solenoid 14 is energized, its armature 15 is pulled inwardly and rotates the bell crank 16 in a counter-clockwise direction (in Fig. 2) thereby building up stress in the spring 18 which as the armature approaches the end of its stroke snaps the shutter 13 to open position against the tension of coil spring 19. When the solenoid is subsequently deenergized, the distended coil spring 19 pulls the bell crank 16 back to its normal position, causing the spring 18 to snap the shutter 13 closed. The shutter 13, is prevented by stop members 21 and 22 from being moved beyond certain predetermined limits by the spring 19 and solenoid 14 respectively.

Secured as by screws to the armature 15 is a block 23 which has a spring pressed ratchet 24 pivotally mounted thereon. The ratchet engages with the periphery of a ratchet wheel 25 which is rotatably mounted on the upper side of the panel 8 on a screw or pin 26. The movement of the armature 15, the block 23 and the ratchet 24 by the spring 19 in an outward direction away from the solenoid when the latter is deenergized causes the ratchet 24 to rotate the ratchet wheel 25 in a clockwise direction (in Fig. 3) for approximately one-eighth of one revolution. A reverse or counter clockwise movement of the wheel 25 is prevented by a spring pressed pawl 27 engaging with the teeth of the former. The ratchet wheel 25 is provided with four metal contact pins 28 which extend entirely through and beyond the opposite sides of the ratchet wheel 25. The pins 28 are positioned approximately ninety degrees apart and are insulated from the wheel by suitable insulating sleeves through which they extend.

Extending from an insulating block 29 secured to the panel 8 are two pair of contact members 30 and 31 which are positioned to engage with the opposite ends of contact pins 28. The pair of contact members 30 are electrically connected to the solenoid 14 and the contact members 31 are electrically connected to an electric motor 32, both the solenoid and motor being also connected in a circuit leading to a source of electrical power. The contact members 30 are adapted to slidably engage with the projecting ends of any one of the pins 28 and thereby complete the circuit to the electro-magnet 14 which is also electrically connected to a hand operated switch 33. The contact members 31 are also adapted to contact with any one of the contact pins 28 and thereby complete the circuit to the electric motor 32. The contact members 30 and 31 are so positioned with respect to each other that when the pair of contact members 30 are in engagement with one of the contact pins 28, the other pair of contact members 31 are not in engagement with any of the said pins and vice versa. Thus when the circuit to the solenoid 14 is closed the circuit to the motor 32 is open, and vice versa.

Figure 3:
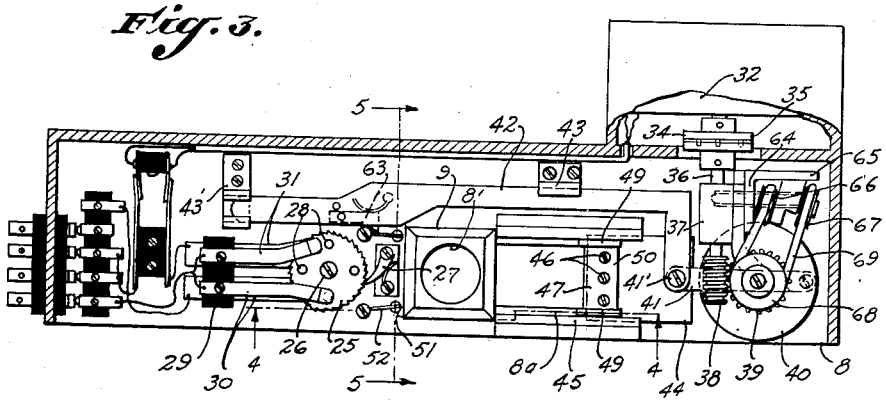
Fig. 3 is a horizontal section taken at 3—3 of Fig. 1.

The closing of the hand operated switch 33 completes the circuit through the contact members 30 and the particular pin 28 with which the latter are then engaging, to the solenoid 14. The consequent energizing of the solenoid causes the armature 15 to rotate the bell crank 16 to open the shutter 13, thus permitting an exposure of the film 10 to be made through apertures 7' and 8'. The shutter remains open until the film is sufficiently exposed, at which time the hand operated switch is opened, and the solenoid being thereby deenergized, permits the armature 15 to be withdrawn by the spring 19. The movement of the armature in a direction away from the solenoid not only closes the shutter but causes the ratchet 24 to engage with the teeth of the ratchet wheel 25 and turn the latter approximately an eighth of one revolution in a clockwise direction, (Fig. 3). One of the contact pins 28 is thereby carried by the wheel 25 to a point where it engages with the contact members 31, while at the same time the particular pin 28 which was just previously in engagement with the contact members 30 is carried out of engagement therewith. Thus the circuit to the motor 32 is automatically closed immediately after the opening of the circuit to the solenoid.

The closing of the circuit to the motor commences the operation of the film-advancing mechanism, thereby causing a succeeding unexposed frame of the film to be moved at a time when the shutter is closed, into a position where it is in registry with the camera lens and the apertures 7' and 8' in the panels 7 and 8. The motor shaft is secured to a disc 34 on which are provided a plurality of projecting pins that detachably extend into a series of holes arranged in a similar disc 35. The disc 35 is secured to a rotatable shaft 36 which extends through a bearing and supporting member 37. The end of the shaft 36 has a worm gear 38 thereon which meshes with a circular gear 39 centrally secured to a rotatable disc 40. Pivotably attached at one end to the disc 40 at a point near the latter's periphery, is a rod 41 which is pivotally attached at its opposite end as at 41' to an elongated bar 42. The bar 42 is slidably mounted in guide members 43 and 43' and is adapted to be moved back and forth with reciprocating motion by the rod 41 and disc 40 when the latter is rotated by the motor 32. The bar 42 carries a spring pressed ratchet 63 which rides over the teeth of the ratchet wheel 25 when the bar is initially moved away from the disc 40, but which engages with the said teeth and causes the turning of the said wheel in a clockwise direction for an eighth of one revolution when it moves back toward the disc 40. The turning of the wheel 25 by the ratchet 63 carries the particular pin 28 then contacting with the contact members 31 out of engagement with the latter, thereby breaking the circuit to the motor. When the ratchet wheel 25 is moved to disengage the contacting pin 28 and the contact members 31, another of the said pins 28 is carried into engagement with the contact members 30, thereby again placing the solenoid circuit in a condition where it may be completed by closing the hand operated switch 33.

As will be seen, a complete revolution of the disc 40 moves the bar 42 first in one direction for its full stroke and then back again for the same distance in the reverse direction. Pivotally attached as at 41' to the rod 41 is a block 44 which is slidably mounted in guides 45 secured to the upper side of the panel 8. Secured as by screws 46 to the block 44 is a plate 47 to which are pivotally attached as at 48 a pair of spaced dogs or film advancing pins 49. The dogs movably extend through slots 8a located in the panel 8 and are adapted to enter the perforations of the film 10. The ends of the film advancing pins are beveled or cut away in such a manner that when they are carried in a direction toward the light opening 8', they freely slide over the film 10 and the perforations along the edges thereof, but when they are moved in an opposite direction, they enter the perforations in the film and move the film in the same direction. A spring 50 secured to the plate 47 as by one or more of the screws 46 exerts a continual pressure upon the pins so that their beveled ends are held in engagement with the film. So as to prevent the movement of the film 10 in a reverse direction when the pins 49 are carried backwardly after the said film has been advanced thereby, a pair of film retaining pins 51, beveled at their ends in the same manner as the pins 49 are positioned to enter the perforations in the film. The pins 51 extend through holes in the panel 8 and are yieldably held by springs 52 in engagement with the film 10. The initial half revolution of the disc 40 moves the film advancing pins 49 toward the aperture 8' and the film is held in position by the retaining pin 51. The completed rotation of the disc brings the dogs back and by reason of their position in the film perforations, moves the film one frame distance. It will be noted that immediately after the advancing of the film into position for the succeeding exposure, the ratchet wheel 25 is turned so as to break the circuit to the motor 32.

Fastened to the bearing and supporting member 37 is a bracket 64 with a laterally extending arm 65 on which are mounted a pair of pulleys 66 and 67 rotating in a substantially vertical plane and disposed adjacent to a pulley 68 mounted on the end of the shaft carrying the gear 39 and disc 40. Suitable holes are provided in the panel 8 immediately below the pulleys 66 and 67 to allow a spring belt 69 which is threaded around pulley 68 and pulleys 66 and 67 to pass down to the space below panel 8. A take-up pulley 70 is mounted on the inside of the casing 6 immediately below the pulleys 66 and 67 and adjacent the take-up magazine 61. The take-up pulley 70 is operatively connected to a take-up reel or spindle (not shown) in the magazine 61. The belt 69 passes over pulley 70 and back up to pulleys 66 and 67 so that rotation of the shaft of disc 40 will be transferred to the take-up reel through take-up pulley 70 to wind up the exposed film after it has been advanced past the aperture 8' by means of the film advancing pins 49 as previously set forth. Each of the magazines 60 and 61 is provided with a light tight opening through which the film passes upon entry or exit so that the magazines may be removed from the camera without danger of fogging the film contained therein.

Without the necessity of a detailed description, it will be readily observed that by the provision of separable connections either or both of the panels 7 and 8, together with the parts of the apparatus secured thereon, may be conveniently removed from the camera casing after first opening the hinged door 6' at the rear side of the casing, it being understood of course that the door 6' is normally kept closed except when loading and unloading the camera so that during operation the camera is light tight throughout.

While my invention is illustrated as embodying mechanism for use with cinematographic film, it will be obvious to those skilled in the art that by making minor modifications, it may be adapted for use with other types of film strips.

I claim:

1. Apparatus for the production of Roentgen ray photographs which includes: a fluoroscope having a fluorescent screen adapted to receive Roentgen rays upon their passage through a body; a mirror angularly disposed in back of said screen within said fluoroscope and positioned to receive light rays therefrom; and a camera provided with a lens focussed on said mirror, the optical axis of said lens being substantially parallel to the plane of said screen, said camera being provided with a shutter and mechanism for opening said shutter to expose a film in said camera and automatically advancing said film one frame distance upon the closing of said shutter.

2. Apparatus for the production of Roentgen ray photographs which includes: an elongated hood having a fluorescent screen in its forward end and a transversely extending tube of reduced cross-section at its rear end; a mirror angularly disposed in the rear end of said hood and positioned to reflect light rays from said screen into said transverse tube; and a camera having a lens focussed on said mirror through said tube, said camera being provided with a shutter and electrically-operated mechanism associated therewith for opening said shutter to expose a film in said camera, closing said shutter and automatically advancing said film one frame distance.

3. Apparatus for the production of Roentgen ray photographs which includes: an elongated substantially horizontal hood having a fluorescent screen across its forward end and a downwardly-extending tube of reduced cross-section at its rear end; a mirror angularly disposed in the rear end of said hood above said tube and positioned to reflect light rays from said screen into said tube; and a camera positioned below said hood and having a lens shielded by said tube and focussed on said mirror, said camera being provided with a shutter and manually-controlled electrically-operated means for opening said shutter to expose a film in said camera, closing said shutter upon the release of said control means and automatically advancing said film one frame distance only, without further operation of said control means.

4. Apparatus as defined in claim 3 in which said hood is provided with a sight opening in its rear end for viewing said screen.

CHARLES F. JONES.